Nov. 7, 1967     S. FISCHER     3,350,740
DEVICE FOR MAKING HOLLOW BODIES FROM THERMOPLASTIC MATERIAL
Filed March 18, 1965     2 Sheets-Sheet 1
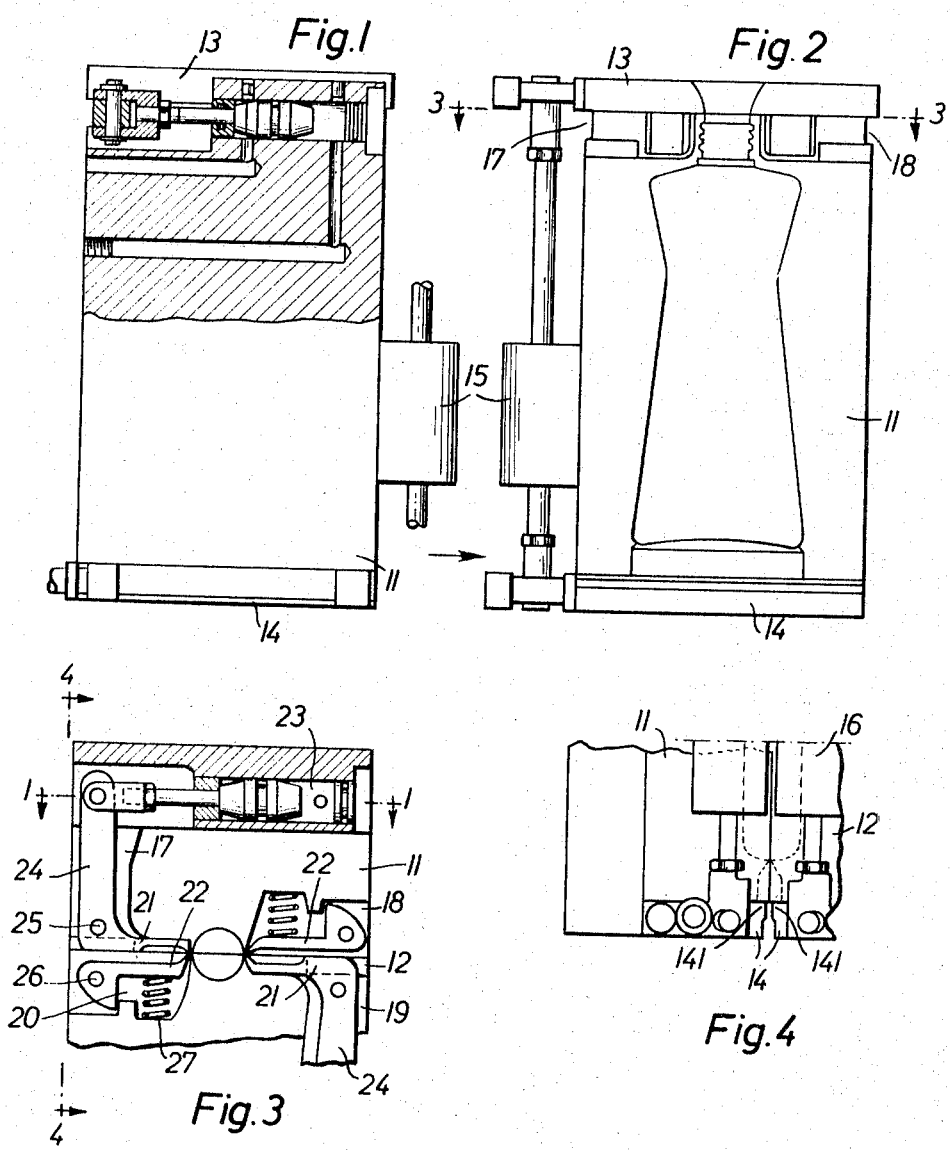
INVENTOR
STEFAN FISCHER
BY
Kleinberg & Lilling
ATTORNEYS Nov. 7, 1967  S. FISCHER  3,350,740

DEVICE FOR MAKING HOLLOW BODIES FROM THERMOPLASTIC MATERIAL

Filed March 18, 1965  2 Sheets-Sheet 2

INVENTOR
STEFAN FISCHER
BY
Kleinberg & Lillig
ATTORNEYS

United States Patent Office 3,350,740
Patented Nov. 7, 1967

3,350,740
DEVICE FOR MAKING HOLLOW BODIES FROM THERMOPLASTIC MATERIAL
Stefan Fischer, Lohmar, Cologne, Germany
Filed Mar. 18, 1965, Ser. No. 440,809
Claims priority, application Germany, Mar. 20, 1964, F 42,373
4 Claims. (Cl. 18—5)

ABSTRACT OF THE DISCLOSURE

This invention relates essentially to an apparatus for forming hollow objects comprising a split mold and including means associated with said mold for grasping and removing excess material, said means being actuated in a direction substantially perpendicular to the parting line by the opening and closing of said mold so as to tear off the excess material from the molded object.

---

This invention relates primarily to an apparatus for manufacturing formed hollow objects from heat workable material. Such units eventually utilize a split mold to receive the parison of heated material together with tear-off apparatus for removing the excess material.

The construction of the mechanism for tearing off or removing the excess material on machines of the above type present certain difficulties. Such units are usually somewhat expensive.

It is a cardinal object of this invention, therefore, to provide a new and improved mechanism to tear-off excess plastic material from about a blow mold.

Another primary object hereof is to provide a unit as above-described that is inexpensive, relatively simple to operate, and suitable for universal use.

Essentially, the apparatus of the instant invention comprises a device for making hollow objects as by the well known plastic blow molding techniques or the like and includes a split mold to receive a parison of material in workable form. As part of the manufacturing process, the mold will close about the parison and squeeze off any excess material. A tear off device is provided to remove the said excess material. Essentially the tear off device is comprised of a flap like moving and clamping unit.

The clamping flaps can be arranged in conjunction with the forming molds whereby pairs of clamping flaps are utilized to grasp and remove the excess material.

Each of the flaps of each pair of flaps can be simultaneously operated in the desired direction of the tear off movement. If desired, however, it is also possible to activate only one flap, which is activated and urged by a spring to press against the other flap.

Of course, if desired, a plunger or piston can be utilized to activate the said flap.

The tear off flaps may be actuated by hydraulic cylinders or the like. One control cylinder may be utilized to simultaneously operate two or more flaps. If necessary, it is possible to operate one flap directly from a control cylinder which is coupled with other flaps through a series of levers or the like.

It is important to note that the instant invention permits many modes and forms of construction.

With these objects in view the invention consists of the novel features of construction and arrangement of parts which will appear in the following specification and recited in the appended claims reference being had to the accompanying drawings in which the same reference numerals indicate the same parts through the various figures, and in which:

FIG. 1 is a top view partly in section of one-half of a blow mold taken substantially along line 1—1 of FIG. 3.

FIG. 2 is an elevational view of the mold, as viewed from the interior or internal cavity side.

FIG. 3 is a sectional view taken substantially along line 3—3 of FIG. 2, showing the top of one-half of the mold together with a portion of the other half.

FIG. 4 is a fractional view taken substantially along line 4—4 of FIG. 3.

Figure 5:
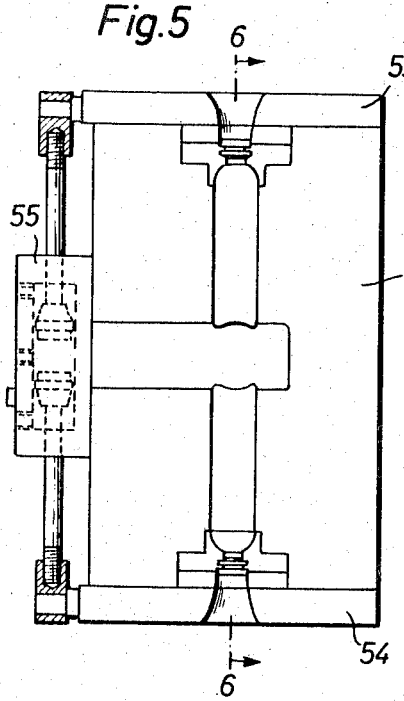
FIG. 5 is a view taken substantially along line 5—5 of FIG. 7 and showing a half of a double-cavity mold.

It is to be realized that there is shown in the drawings merely two exemplary embodiments of the invention.

The drawings illustrate merely the molds of a blow molding unit or the like. It is to be understood that the mold, constructed in two separable mold halves may be closed about a tubular parison. The parison is then inflated under pressure into the interior shape of the cavity of the closed mold, allowed to cool and harden, to form the finished product. A typical head for extruding the parison of plastic material within the cavity of the mold is illustrated in issued Patent No. 3,048,889.

In the embodiment of the invention illustrated in FIGS. 1 through 4, the parison or heated tubular material has a diameter somewhat greater than the neck of the bottle to be fabricated. Thus, it will be apparent that as the mold closes about the parison, the mold will squeeze off the excess material, at the top of the neck and also at the sides of the neck of the bottle.

For removing this squeezed off material at the neck of the bottle, clamping flaps 13 and 14 are provided at the mold halves 11 and 12. It is to be noted that in this illustrative embodiment, flaps are provided at the top and at the bottom of the mold.

It will be apparent that as each of the pairs of flaps 13 and 14 pivotally close, it will grasp the squeezed off material at the neck and at the bottom of the bottle. At the bottom of the bottle additional clamping edges 141 are provided.

As soon as the heated material, which is blown and formed within the internal cavity of the mold, has reached a certain degree of cooling and hardening, the clamping flap pairs 13 and 14 are urged outwards a predetermined amount. They thus grasp and tear off the excess material at the mold seams.

The flap pairs 13 and 14 may be pivoted or swiveled in order to open and close about the excess material. For this purpose, control cylinders 15 and 16 are provided. The movement may be arranged to activate the flaps a sufficient distance so that the excess material is entirely removed. Alternately the flaps can move the excess material only a distance sufficient to tear off the same, and the excess material can be disposed of during the next subsequent opening of the mold halves.

For tearing off the excess material at the longitudinal sides of the neck of the bottle or the like being formed, tear off devices may be disposed within recesses 17, 18, 19 and 20 at the upper edge of the mold halves 11 and 12. Each of the flap pairs comprise an actuated flap 21 and a spring-urged flap 22. The movement of the actuated flap 21 occurs as a result of the movement of control cylinder 23. For tearing off the waste, the flap swings rearward as a result of the connection of arm 24 to flap 21. The unit pivots about pin 25 and therefore, the flap 21 may be urged and pivoted to its cutoff and to its removed position alternately. As a result flap 21 will move over the partition line of the mold halves 20 toward flap 22 which is pivoted at 26. Flap 22 is urged by return spring 27 to bear against flap 21 so that any waste picked up between the two flaps is torn off at the point of junction with the neck of the bottle. When the mold opens after the container is formed, the torn off material is then pushed out by flap 22 moving back under the influence of the return spring to the illustrated starting position.

Figure 6:
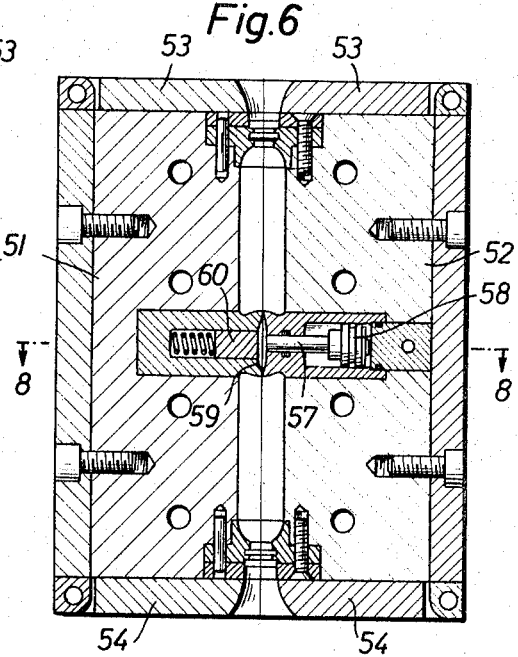
FIG. 6 is a sectional view taken substantially along line 6—6 of FIG. 7.
Figure 7:
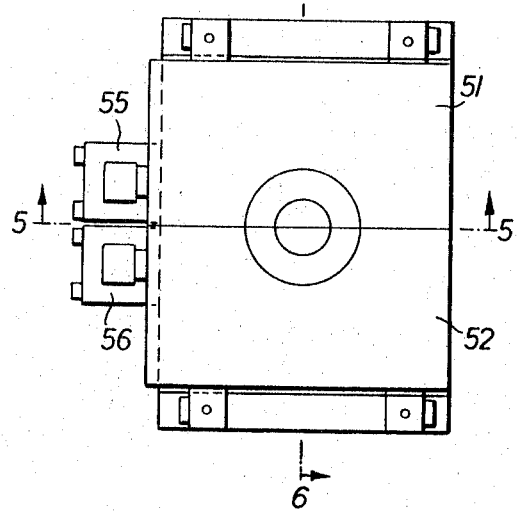
FIG. 7 is a plan view of the double cavity mold shown in FIG. 5.
Figure 8:
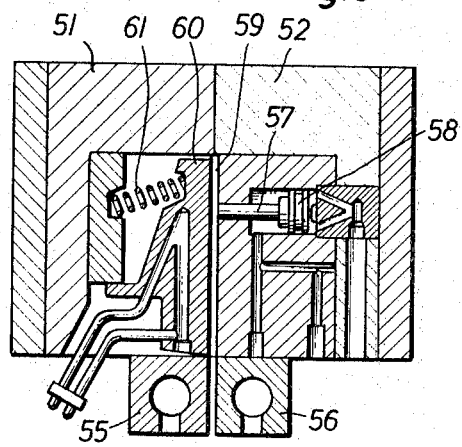
FIG. 8 is a sectional view taken substantially along line 8—8 of FIG. 6.

In the embodiment of the invention illustrated in FIGS. 5 through 8, a parison is used which is not squeezed off in the area of the container neck. There is shown in this embodiment a double-cavity mold wherein two hollow bodies or containers are simultaneously formed from one parison. In this embodiment, the bottoms of the containers face each other.

In this embodiment, the mold consists again of two halves 51 and 52 which upon closing, squeeze off any excess material. This squeezing off in the area of the opening to the mold is accomplished in the well known manner by the blowing mandrel which is introduced from the top and the bottom into the closed mold halves.

For tearing off the material which is excess at the mouths of the bottles, there is shown clamping flap pairs 53 and 54 which are against the top and bottom of the mold halves respectively. These clamping flap pairs 53 and 54 correspond to flap pairs 13 and 14 shown and described for FIGS. 1 through 4. The flap pairs 53 and 54, move as a result of control cylinders 55 and 56 through a system of levers which are connected with flaps 53 and 54 and each of which operates one flap for each pair of flaps.

For tearing off the parts of the heated parison which is squeezed between the two bottle bottoms and squeezed off at the bottoms in the center of the mold, there is provided a plunger 57 which is hydraulically operated by a control piston 58 and which presses against the material squeezed together in hollow space 59. The material is thereby torn off at the seams at the bottoms of the two bottles and pressed against flap 60 against the pressure of plunger 57 and then is pressed into the mold halves against the urging of springs 61. This flap is provided with pipes 62 and 63 for the delivery and discharge of a cooling medium or the like and upon opening of the molds, ejects by means of springs 61 the separated material disposed directly in front of it.

It will be seen then that there is provided herein a device to accomplish all of the objects previously set forth and others.

While there are above disclosed but a limited number of embodiments of the structure and product of the invention herein presented, it is possible to produce still other embodiments without departing from the inventive concept herein disclosed, and it it desired therefore, that only such limitations be imposed on the appended claims as are stated therein, or required by the prior art.

Having thus described my invention and illustrated its use, what I claim as new and desire to secure by Letters Patent is:

1. In an apparatus for forming hollow objects from heat-formable thermoplastic material which includes, a split mold, means for ejecting a heated parison of the thermoplastic material between the open halves of the said mold, means for closing the mold about said parison and to squeeze excess material, the combination comprising; tear-off means for removing said excess material; said tear-off means including at least one spring-biased flap associated with one of said mold halves and at least one actuable flap associated with the other of said mold halves, said actuable flap being positioned for movement toward and against said spring-biased flaps, whereby the actuable flaps will be actuated upon the closing of the said split mold to effect clamping of the excess material between said spring-biased flaps and said actuable flaps so that the excess material will be displaced in a direction substantially perpendicular to the parting line of the said split mold thus effecting a tearing-off of the said excess material from the finished molded object.

2. An apparatus according to claim 1, wherein said actuable flap is a fluid controlled piston.

3. An apparatus according to claim 1, including at least a pair of spring-biased and a pair of actuable flaps, one of each of said pairs of flaps being positioned adjacent the top portion of the said split mold and the other of each of said pairs being positioned adjacent the bottom of said split mold; both of said actuable flaps being linked to a fluid actuated cylinder; whereby upon the closing of the said mold halves, the said cylinder will be actuated so as to simultaneously actuate both of said actuable flaps, thus causing the excess material to be squeezed between each pair of flaps and thereby causing a displacement of the excess material at the top and bottom portions of the mold cavity in a direction substantially perpendicular to the parting line of the said split mold.

4. An apparatus according to claim 3, further including a third spring-biased flap associated with one of said mold halves and a fluid actuated piston associated with the other of said mold halves, both located in the mid-portion of said mold halves; said fluid actuated piston actuable toward and against said third spring-biased flap, whereby upon the closing of the said mold halves the fluid actuated piston will squeeze the excess material between itself and said third spring-biasing flap against said third spring-biased flap thereby causing a displacement of the said excess material in a direction substantially perpendicular to the parting line of the mold.

References Cited

UNITED STATES PATENTS 3,141,196 7/1964 Langecker _____ 18—5 X
3,145,243 8/1964 Hagen _____ 18—5 X J. SPENCER OVERHOLSER, *Primary Examiner.*

WILBUR L. McBAY, *Examiner.*